United States Patent
Thew et al.

(10) Patent No.: US 10,002,464 B1
(45) Date of Patent: Jun. 19, 2018

(54) LIGHT FIELD LIGHT SOURCE ORIENTATION METHOD FOR AUGMENTED REALITY AND VIRTUAL REALITY AND FRONT-END DEVICE

(71) Applicant: PACIFIC FUTURE LIMITED, Hong Kong (HK)

(72) Inventors: Ian Roy Thew, Hong Kong (HK); Kien Yi Lee, Hong Kong (HK)

(73) Assignee: PACIFIC FUTURE LIMITED, Hong Kong (HK)

( * ) Notice: Subject to any disclaimer, the term of this patent is extended or adjusted under 35 U.S.C. 154(b) by 0 days. days.

(21) Appl. No.: 15/381,137

(22) Filed: Dec. 16, 2016

(30) Foreign Application Priority Data

Nov. 29, 2016 (CN) .......................... 2016 1 1086214

(51) Int. Cl.
 G09G 5/00 (2006.01)
 G06T 19/00 (2011.01)
 G06F 3/01 (2006.01)
 G09G 5/10 (2006.01)

(52) U.S. Cl.
 CPC ............ G06T 19/006 (2013.01); G06F 3/011 (2013.01); G09G 5/10 (2013.01); G09G 2320/0646 (2013.01); G09G 2320/0666 (2013.01)

(58) Field of Classification Search
 None
 See application file for complete search history.

(56) References Cited

U.S. PATENT DOCUMENTS

| | | | | |
|---|---|---|---|---|
| 7,869,631 B2 * | 1/2011 | Xu | ...................... | G06K 9/00261 382/103 |
| 2010/0067865 A1 * | 3/2010 | Saxena | ................ | G11B 27/034 386/278 |
| 2013/0127980 A1 * | 5/2013 | Haddick | .................. | G06F 3/013 348/14.08 |
| 2013/0278631 A1 * | 10/2013 | Border | ................. | G02B 27/017 345/633 |
| 2016/0171744 A1 * | 6/2016 | Rhoads | .............. | G06K 9/00208 345/419 |
| 2016/0180590 A1 * | 6/2016 | Kamhi | .................. | G06T 19/006 345/633 |
| 2016/0203641 A1 * | 7/2016 | Bostick | .............. | G02B 27/0172 345/633 |

* cited by examiner

*Primary Examiner* — Peter Hoang

(57) ABSTRACT

The present invention relates to a light field light source orientation method for augmented reality and virtual reality and a front-end device. The method comprises: A: identifying a target marker; B. tracking the target marker; C. analyzing the pixel color shape on the marker object; D. analyzing color difference zones on the marker object and analyzing the shape cast to calculate direction of environmental light source; E. pushing the light source directional data to an augmented reality object; and F. compensating and adjusting the imaging of an augmented reality object: the present invention can collect surrounding environmental factors, such as the light source direction, so as to project a computer-generated object into a reality environment to possess a shadow consistent with that in the reality, so that an augmented reality environment is more realistic and represents a realist shadow effect of the object.

6 Claims, 2 Drawing Sheets

LIGHT FIELD LIGHT SOURCE ORIENTATION METHOD FOR AUGMENTED REALITY AND VIRTUAL REALITY AND FRONT-END DEVICE

CROSS REFERENCE TO RELATED APPLICATIONS

The present application claims the benefit of Chinese patent application No. 201611086214.0 filed on Nov. 29, 2016. All the above are hereby incorporated by reference.

TECHNICAL FIELD

The present invention relates to the technical field of computer simulation, in particular to a light field light source orientation method and system for augmented reality and virtual reality.

BACKGROUND

In augmented reality at the present stage, a virtual object and a light field of a reality environment lack of direct interaction and corresponding adjustment to achieve the reality of the object, including change of an object shadow and integration degree of an object surface. Interaction with the reality environment can only be conducted through two modes: a hardware photo sensor or GPS and position data. The augmented reality at the present stage has the following disadvantages:

Early 3D data collection of the virtual object has extremely high requirements; and too large data needs to be processed, causing low reaction speed. For a device of a user, such as an AR helmet, a mobile-end device has high hardware demands and high cost. Manufacture of contents is complex, has many conditional limitations and is low in efficiency. Device configuration is enhanced depending on hardware solutions, causing overlarge device and poor user experience.

SUMMARY

The main purpose of the present invention is to provide a light field light source orientation method for augmented reality and virtual reality and a front-end device. The present invention can collect surrounding environmental factors, such as the light source direction, so as to project a computer-generated object into a reality environment to possess a shadow consistent with that in the reality, so that an augmented reality environment is more realistic and restores a real effect of the object.

To solve the technical problem, the present invention adopts the following technical solution:

The present invention provides a light field light source orientation method for augmented reality and virtual reality, comprising steps:

A. identifying a target mark as follows: collecting image data through a front-end device and identifying the collected image data;

B. tracking the target mark as follows: tracking the position of a certain object in the image data by the front-end device; obtaining the surface shape and feature of the certain object; and locking a pixel color disc of the certain object through combined establishment of algorithm binding and engine matching;

C. analyzing the pixel color disc on the certain object as follows: collecting the locked pixel color disc of the certain object, and analyzing and obtaining a data value of the pixel color disc;

D. analyzing a grey zone on the certain object as follows: analyzing, by the front-end device, a BLOB of the certain object, judging a refraction angle, length and brightness of the grey zone of the certain object according to the BLOB, and determining a light source direction in a place where the front-end device is located, a distance between the front-end device and a light source, and the intensity of the light source according to the refraction angle, the length and the brightness of the grey zone;

E. pushing the data to a light field of a virtual object as follows: pushing the data into the light field of the virtual object after converting the data into identifiable data of the front-end device according to the data value of the pixel color disc of the certain object, the light source direction, the distance between the front-end device and the light source and the intensity of the light source; and F. compensating and adjusting the imaging of the virtual object: adjusting the virtual object and a shadow of the virtual object through the data value of the pixel color disc of the certain object, the light source direction, the distance between the front-end device and the light source and the intensity of the light source, so that a virtual scenario is more realistic and clear.

Preferably, the data value of the pixel color disc comprises: hue-color essential attributes, saturation-color purity of 0-100% value and lightness and brightness of 0-100% value.

Preferably, step D is as follows: converting the refraction angle, the length and the brightness into identifiable codes of the front-end device; determining the light source direction in the place where the front-end device is located according to identification codes of the refraction angle; determining the distance between the front-end device and the light source according to identification codes of the length of the grey zone; and determining the intensity of the light source according to identification codes of the brightness of the grey zone.

Preferably, the front-end device is a mobile phone or helmet glasses.

Preferably, the method also comprises steps of adjusting brightness, hue and saturation of the virtual object through the data value of the pixel color disc of the certain object, the light source direction, the distance between the front-end device and the light source and the intensity of the light source; adjusting the refraction angle, the length and the brightness of the shadow of the virtual object according to the light source direction, the distance between the front-end device and the light source and the intensity of the light source; and the virtual scenario is more realistic and clear.

Embodiments of the present invention also provide a front-end device, comprising:

a target mark identifying unit used for collecting image data and identifying the collected image data;

a target mark tracking unit used for tracking the position of a certain object in the image data, obtaining the surface shape and feature of the certain object, and locking a pixel color disc of the certain object through combined establishment of algorithm binding and engine matching;

a pixel color disc analyzing unit used for collecting the locked pixel color disc of the certain object, and analyzing and obtaining a data value of the pixel color disc;

a grey zone analyzing unit used for analyzing a BLOB of the certain object, judging a refraction angle, length and brightness of the grey zone of the certain object according to the BLOB, and determining a light source direction in a place where the front-end device is located, a distance between the front-end device and a light source, and the intensity of the light source according to the refraction angle, the length and the brightness of the grey zone;

a data pushing unit used for pushing the data into the light field of the virtual object after converting the data into identifiable data of the front-end device according to the data value of the pixel color disc of the certain object, the light source direction, the distance between the front-end device and the light source and the intensity of the light source; and a compensation and adjustment unit used for adjusting the virtual object and a shadow of the virtual object through the data value of the pixel color disc of the certain object, the light source direction, the distance between the front-end device and the light source and the intensity of the light source, so that a virtual scenario is more realistic and clear.

Preferably, the grey zone analyzing unit is used for converting the refraction angle, the length and the brightness into identifiable codes of the front-end device; determining the light source direction in the place where the front-end device is located according to identification codes of the refraction angle; determining the distance between the front-end device and the light source according to identification codes of the length of the grey zone (shadow); and determining the intensity of the light source according to identification codes of the brightness of the grey zone.

Preferably, the data value of the pixel color disc comprises: hue-color essential attributes, saturation-color purity of 0-100% value and lightness and brightness of 0-100% value.

Preferably, the compensation unit is used for adjusting brightness, hue and saturation of the virtual object through the data value of the pixel color disc of the certain object, the light source direction, the distance between the front-end device and the light source and the intensity of the light source, and adjusting the refraction angle, the length and the brightness of the shadow of the virtual object according to the light source direction, the distance between the front-end device and the light source and the intensity of the light source; and the virtual scenario is more realistic and clear.

Preferably, the front-end device comprises a mobile phone or helmet glasses.

Through implementation of the technical solution of the present invention, the following beneficial effects are generated: the method and the device provided by the present invention solve the problems of too high configuration of front-end data collection hardware, high cost of data transmission device and poor user experience of a helmet device of a display end; solve the problems that the virtual object cannot be integrated into the light field of the reality environment, the shadow cannot be accurately tracked, a light ray angle is inaccurate and the object display is floating and is in the air; solve the problem of serious color difference caused by an influence of the light field on the color; and solve the problem of high manufacture cost because the virtual object is only limited to a digitized image and a projected real object. By detecting the light source direction of the reality environment, the object projected from a virtual augmented environment is consistent with a reality shadow direction, the reflective refraction angle and the brightness are adjusted, and the reality of the projected object in the reality environment is increased. Under the condition of completing light field reduction of the virtual object without a strong front-end data collection device, complicated early manufacture and subsequent terminal display hardware with high cost, the virtual object can be integrated into the light field of the reality environment in real time, so that naked eye experience of a user is closer to the reality.

Realization of the purpose, functional characteristics and advantages of the present invention will be further described in combination with the embodiments and with reference to the drawings.

DETAILED DESCRIPTION

To make the purpose, the technical solution and the advantages of the present invention more clear, the present invention will be further described below in detail in combination with the drawings and the embodiments. It should be understood that specific embodiments described herein are only used for explaining the present invention, not used for limiting the present invention.

Figure 1:
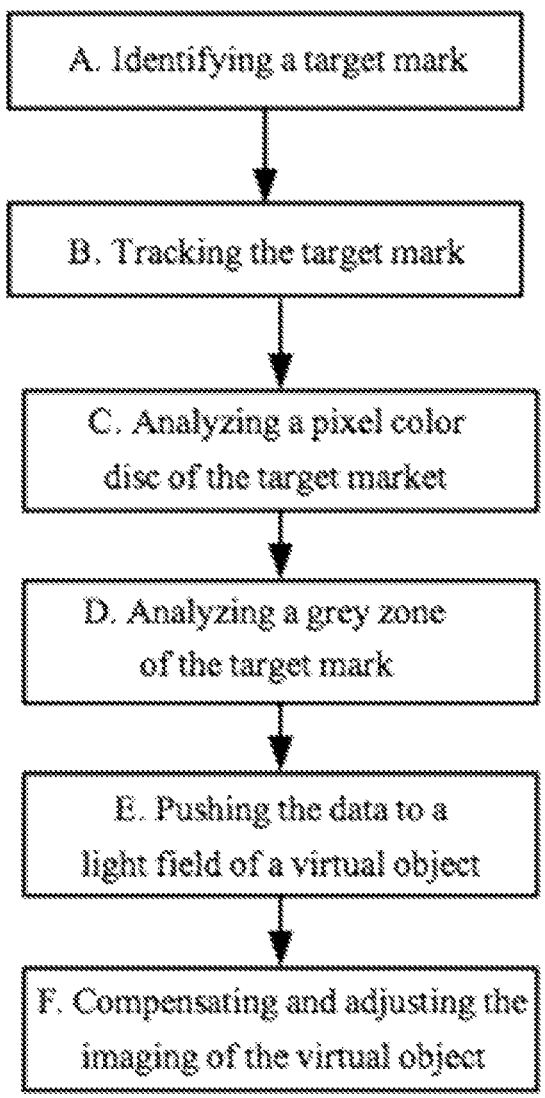
FIG. 1 is a flow chart of a method provided by the embodiments of the present invention.

The embodiments of the present invention provide a light field light source orientation method for augmented reality and virtual reality. As shown in FIG. 1, the method comprises steps:

A. identifying a target mark as follows: collecting image data through a front-end device and identifying the collected image data; in the present embodiment, more specifically, the front-end device is a mobile phone or helmet glasses;

B. tracking the target mark as follows: tracking the position of a certain object in the image data by the front-end device; the certain object is an object in the image; for example, a bird or a tree on a mountain in a landscape painting can act as a certain object; subsequent description contents in the present embodiment are based on the certain object; obtaining the surface shape and feature of the certain object, and locking a pixel color disc of the certain object through combined establishment of algorithm binding and engine matching;

C. analyzing the pixel color disc on the certain object as follows: collecting the locked pixel color disc of the certain object, and analyzing and obtaining a data value of the pixel color disc; in the present embodiment, more specifically, the data value of the pixel color disc comprises: hue-color essential attributes (H), saturation-color purity of 0-100% value (S) and lightness (V) and brightness (L) of 0-100% value.

D. analyzing a grey zone on the certain object as follows: analyzing, by the front-end device, a BLOB (binary large object) of the certain object, judging a refraction angle, length and brightness of the grey zone of the certain object according to the BLOB, and determining a light source direction in a place where the front-end device is located, a distance between the front-end device and a light source, and the intensity of the light source according to the refraction angle, the length and the brightness of the grey zone; in the present embodiment, more specifically, step D is as follows: converting the refraction angle, the length and the brightness into identifiable codes of the front-end device; determining the light source direction in the place where the front-end device is located according to identification codes of the refraction angle; determining the distance between the front-end device and the light source according to identification codes of the length of the grey zone (shadow); and determining the intensity of the light source according to identification codes of the brightness of the grey zone;

E. pushing the data to a light field of a virtual object as follows: pushing the data into the light field of the virtual object (an image formed by projecting the certain object) after converting the data into identifiable data of the front-end device according to the data value of the pixel color disc of the certain object, the light source direction, the distance between the front-end device and the light source and the intensity of the light source; and F. compensating and adjusting the imaging of the virtual object: adjusting the virtual object and a shadow of the virtual object through the data value of the pixel color disc of the certain object, the light source direction, the distance between the front-end device and the light source and the intensity of the light source, so that a virtual scenario is more realistic and clear. In the present embodiment, more specifically, the step F is as follows: adjusting brightness, hue and saturation of the virtual object through the data value of the pixel color disc of the certain object, the light source direction, the distance between the front-end device and the light source and the intensity of the light source; adjusting the refraction angle, the length and the brightness of the shadow of the virtual object according to the light source direction, the distance between the front-end device and the light source and the intensity of the light source; and the virtual scenario is more realistic and clear.

The method provided by the above embodiment solves the problems of too high configuration of front-end data collection hardware, high cost of data transmission device and poor user experience of a helmet device of a display end; solve the problems that the virtual object cannot be integrated into the light field of the reality environment, the shadow cannot be accurately tracked, a light ray angle is inaccurate and the object display is floating and is in the air; solve the problem of serious color difference caused by an influence of the light field on the color; and solve the problem of high manufacture cost because the virtual object is only limited to a digitized image and a projected real object. By detecting the light source direction of the reality environment, the object projected from a virtual augmented environment is consistent with a reality shadow direction, the reflective refraction angle and the brightness are adjusted, and the reality of the projected object in the reality environment is increased. Under the condition of completing light field reduction of the virtual object without a strong front-end data collection device, complicated early manufacture and subsequent terminal display hardware with high cost, the virtual object can be integrated into the light field of the reality environment in real time, so that naked eye experience of a user is closer to the reality.

Figure 2:
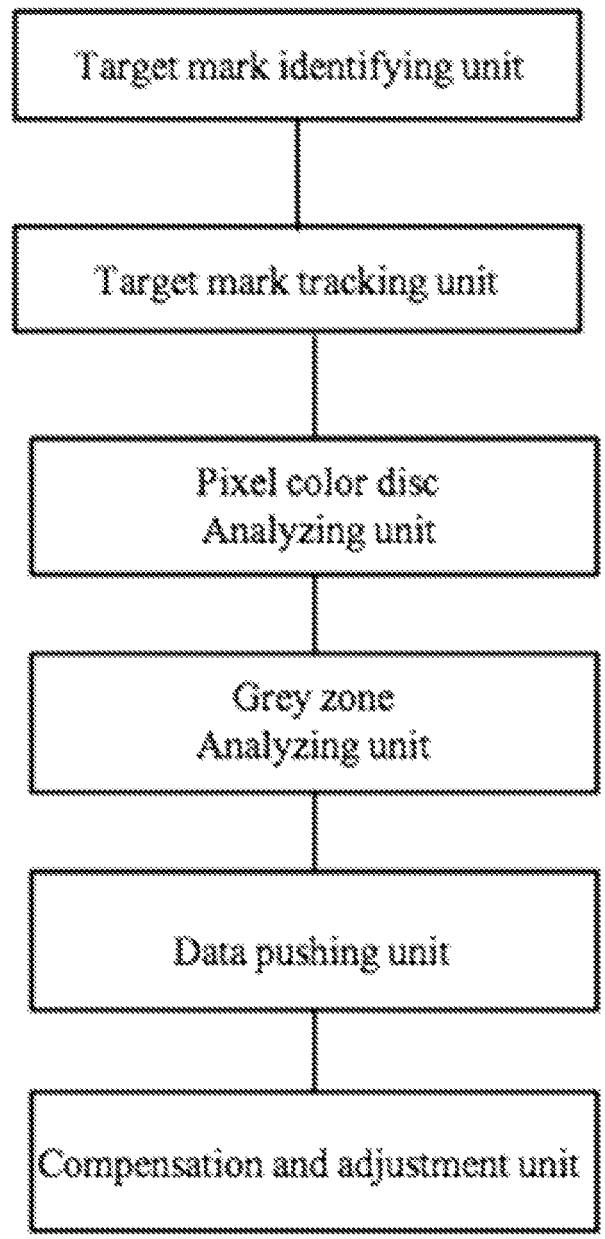
FIG. 2 is a structural schematic diagram of a device provided by the embodiments of the present invention.

Embodiments of the present invention also provide a front-end device. As shown in FIG. 2, the front-end device comprises:

a target mark identifying unit used for collecting image data and identifying the collected image data;

a target mark tracking unit used for tracking the position of a certain object in the image data, obtaining the surface shape and feature of the certain object, and locking a pixel color disc of the certain object through combined establishment of algorithm binding and engine matching;

a pixel color disc analyzing unit used for collecting the locked pixel color disc of the certain object, and analyzing and obtaining a data value of the pixel color disc;

a grey zone analyzing unit used for analyzing a BLOB (binary large object) of the certain object, judging a refraction angle, length and brightness of the grey zone of the certain object according to the BLOB, and determining a light source direction in a place where the front-end device is located, a distance between the front-end device and a light source, and the intensity of the light source according to the refraction angle, the length and the brightness of the grey zone;

a data pushing unit used for pushing the data into the light field of the virtual object (an image formed by projecting the certain object) after converting the data into identifiable data of the front-end device according to the data value of the pixel color disc of the certain object, the light source direction, the distance between the front-end device and the light source and the intensity of the light source; and a compensation and adjustment unit used for adjusting the virtual object and a shadow of the virtual object through the data value of the pixel color disc of the certain object, the light source direction, the distance between the front-end device and the light source and the intensity of the light source, so that a virtual scenario is more realistic and clear.

In the above embodiment, more specifically, the grey zone analyzing unit is used for converting the refraction angle, the length and the brightness into identifiable codes of the front-end device; determining the light source direction in the place where the front-end device is located according to identification codes of the refraction angle; determining the distance between the front-end device and the light source according to identification codes of the length of the grey zone (shadow); and determining the intensity of the light source according to identification codes of the brightness of the grey zone.

In the above embodiment, more specifically, the data value of the pixel color disc comprises: hue-color essential attributes (H), saturation-color purity of 0-100% value (S) and lightness (V) and brightness (L) of 0-100% value.

In the above embodiment, more specifically, the compensation unit is used for adjusting brightness, hue and saturation of the virtual object through the data value of the pixel color disc of the certain object, the light source direction, the distance between the front-end device and the light source and the intensity of the light source, and adjusting the refraction angle, the length and the brightness of the shadow of the virtual object according to the light source direction, the distance between the front-end device and the light source and the intensity of the light source; and the virtual scenario is more realistic and clear.

In the above embodiment, more specifically, the front-end device comprises a mobile phone or helmet glasses.

The device provided by the above embodiment solves the problems of too high configuration of front-end data collection hardware, high cost of data transmission device and poor user experience of a helmet device of a display end; solve the problems that the virtual object cannot be integrated into the light field of the reality environment, the shadow cannot be accurately tracked, a light ray angle is inaccurate and the object display is floating and is in the air; solve the problem of serious color difference caused by an influence of the light field on the color; and solve the problem of high manufacture cost because the virtual object is only limited to a digitized image and a projected real object. By detecting the light source direction of the reality environment, the object projected from a virtual augmented environment is consistent with a reality shadow direction, the reflective refraction angle and the brightness are adjusted, and the reality of the projected object in the reality environment is increased. Under the condition of completing light field reduction of the virtual object without a strong front-end data collection device, complicated early manufacture and subsequent terminal display hardware with high cost, the virtual object can be integrated into the light field of the reality environment in real time, so that naked eye experience of a user is closer to the reality.

The above only describes preferred embodiments of the present invention and is not intended to limit the present invention. Any modification, equivalent replacement, improvement, etc. made within the spirit and the principle of the present invention shall be contained within the protection scope of the present invention.

What is claimed is:

1. A light field light source orientation method for augmented reality and virtual reality, comprising the steps of:
    identifying a target mark as follows: collecting image data through a front-end device and identifying the collected image data, the front-end device being a mobile phone or helmet glasses;
    tracking the target mark as follows: tracking the position of a certain object in the image data by the front-end device; obtaining the surface shape and feature of the certain object, and obtaining a data value of a color space of the certain object, the data value comprising: hue-color essential attributes, saturation-color purity of 0-100% value and lightness and brightness of 0-100% value;
    analyzing a grey zone on the certain object as follows: analyzing, by the front-end device, a BLOB of the certain object, judging a refraction angle, length and brightness of the grey zone of the certain object according to the BLOB, and determining a light source direction in a place where the front-end device is located, a distance between the front-end device and a light source, and the intensity of the light source according to the refraction angle, the length and the brightness of the grey zone;
    pushing the data to a light field of a virtual object as follows: pushing the data into the light field of the virtual object after converting the data into identifiable data of the front-end device according to the data value of the color space of the certain object, the light source direction, the distance between the front-end device and the light source and the intensity of the light source; and
    compensating and adjusting the imaging of the virtual object: adjusting the virtual object and a shadow of the virtual object through the data value of the color space of the certain object, the light source direction, the distance between the front-end device and the light source and the intensity of the light source, so that a virtual scenario is more realistic and clear.

2. The method of claim 1, wherein the step of analyzing a grey zone on the certain object is as follows: converting the refraction angle, the length and the brightness into identifiable codes of the front-end device; determining the light source direction in the place where the front-end device is located according to identification codes of the refraction angle; determining the distance between the front-end device and the light source according to identification codes of the length of the grey zone; and determining the intensity of the light source according to identification codes of the brightness of the grey zone.

3. The method of claim 1, comprising steps of adjusting brightness, hue and saturation of the virtual object through the data value of the color space of the certain object, the light source direction, the distance between the front-end device and the light source and the intensity of the light source; adjusting the refraction angle, the length and the brightness of the shadow of the virtual object according to the light source direction, the distance between the front-end device and the light source and the intensity of the light source; and the virtual scenario is more realistic and clear.

4. A front-end device, the front-end device comprising a mobile phone or helmet glasses comprising:
    a processor;
    a memory coupled with the processor, wherein the processor is configured to execute programmed instructions stored in the memory for
    a target mark identifying process used for collecting image data and identifying the collected image data;
    a target mark tracking process used for tracking the position of a certain object in the image data, obtaining the surface shape and feature of the certain object, and obtaining a data value of a color space of the certain object, the data value comprising: hue-color essential attributes, saturation-color purity of 0-100% value and lightness and brightness of 0-100% value;
    a grey zone analyzing process used for analyzing a BLOB of the certain object, judging a refraction angle, length and brightness of the grey zone of the certain object according to the BLOB, and determining a light source direction in a place where the front-end device is located, a distance between the front-end device and a light source, and the intensity of the light source according to the refraction angle, the length and the brightness of the grey zone;
    a data pushing process used for pushing the data into the light field of the virtual object after converting the data into identifiable data of the front-end device according to the data value of the color space of the certain object, the light source direction, the distance between the front-end device and the light source and the intensity of the light source; and
    a compensation and adjustment process used for adjusting the virtual object and a shadow of the virtual object through the data value of the color space of the certain object, the light source direction, the distance between the front-end device and the light source and the intensity of the light source, so that a virtual scenario is more realistic and clear.

5. The front-end device of claim 4, wherein the grey zone analyzing process is used for converting the refraction angle, the length and the brightness into identifiable codes of the front-end device; determining the light source direction in the place where the front-end device is located according to identification codes of the refraction angle; determining the distance between the front-end device and the light source according to identification codes of the length of the grey zone; and determining the intensity of the light source according to identification codes of the brightness of the grey zone.

6. The front-end device of claim 4, wherein the compensation and adjustment process is used for adjusting brightness, hue and saturation of the virtual object through the data value of the color space of the certain object, the light source direction, the distance between the front-end device and the light source and the intensity of the light source; adjusting the refraction angle, the length and the brightness of the shadow of the virtual object according to the light source direction, the distance between the front-end device and the light source and the intensity of the light source; and the virtual scenario is more realistic and clear.

* * * * *